May 25, 1965  J. E. KASTEN  3,185,449
SCREW CONVEYER FOR FEED MIXER
Filed Oct. 25, 1963
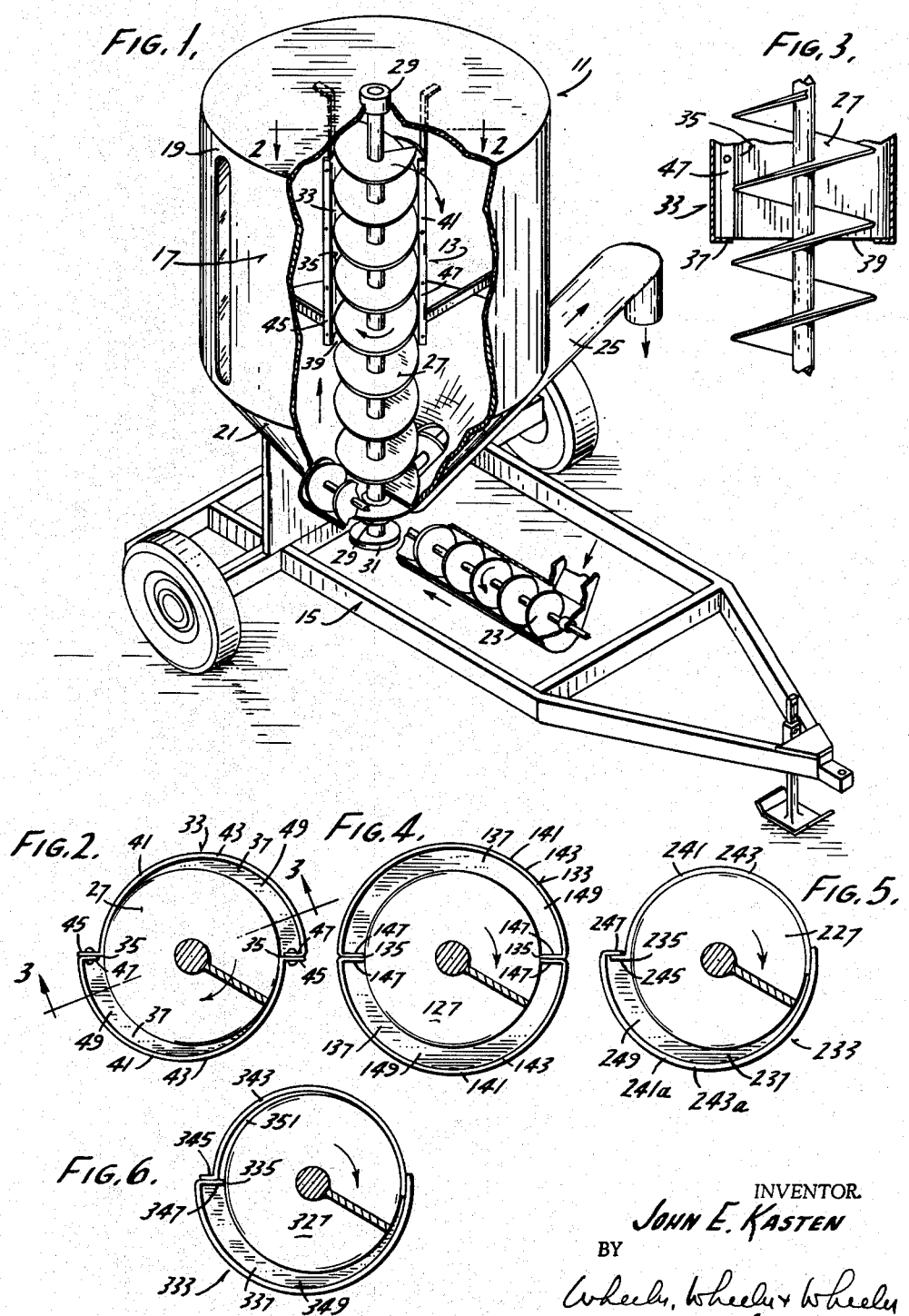
INVENTOR.
JOHN E. KASTEN
BY
Wheeler, Wheeler & Wheeler
ATTORNEYS.

United States Patent Office 3,185,449
Patented May 25, 1965

3,185,449
SCREW CONVEYER FOR FEED MIXER
John E. Kasten, 136 Concord Lane, West Bend, Wis.
Filed Oct. 25, 1963, Ser. No. 319,019
15 Claims. (Cl. 259—6)

The invention relates generally to screw conveyers, and more particularly, to feed mixers incorporating screw conveyers for vertically lifting feed to be mixed within a mixing tank.

The invention provides a screw conveyer including a tubular sleeve or housing having an interior lengthwise edge, and means mounting an auger for rotation in the sleeve with its peripheral edge in close proximity to the lengthwise edge so as to provide for scraping or cleaning of the edge of the auger in response to rotation past the lengthwise edge. Such scraping or cleaning serves to eliminate binding of the auger within the sleeve and generally reduces power requirements.

In the preferred construction, a pair of diametrically opposed lengthwise edges are provided on the interior of the sleeve by joining together a pair of members each including an elongated semi-cylindrical segment, an inwardly turned flange extending from along one lengthwise margin of the semi-cylindrical segment, and an outwardly turned flange extending from along the other lengthwise margin of the semi-cylindrical segment. The members are assembled with the inwardly turned flanges in engagement with the outwardly turned flanges, the edges or corners provided adjacent to the intersection of the outwardly turned flanges and the semi-cylindrical segments serving as the scraping edges. Such edges are particularly well adapted to act as scrapers because of the support received from the circular segments.

Also in the preferred construction, the bottom of the auger extends beyond the lower end of the sleeve and the lower end of the sleeve is provided with a continuously extending, inwardly turned lip which defines a circular opening having a diameter closely approaching that of the auger and which serves to control the quantity of feed entering into the sleeve. This feature also assists in preventing binding of the auger in the sleeve and has been found to greatly reduce the power required for rotating the auger within the sleeve to produce a given discharge rate.

A conveyer embodying the above features finds particular utility when employed as the vertical conveyer in a tank-type feed mixer which, in addition to the vertical conveyer, also includes a supply conveyer and a discharge conveyer. In such a mixer, the vertical conveyer extends upwardly from the bottom of the mixing tank and serves to circulate the ingredients in the tank until thoroughly mixed.

Because of the tendency of certain feeds to conglomerate and to stick to the auger, problems have been encountered in the past with respect to binding of the auger within the sleeve. The scraping effect provided by the disclosed construction serves to improve the efficiency of the auger by breaking up the conglomerations and by freeing the feed from the auger, thereby facilitating its axial displacement by the auger.

Various other objects and advantages of the invention will become known by reference to the following description and accompanying drawings in which FIGURE 1 is a perspective view of a feed mixer embodying various of the features of the invention;

FIGURE 2 is an enlarged sectional view of the vertical conveyer embodied in the feed mixer shown in FIGURE 1;

FIGURE 3 is a fragmentary sectional view taken along line 3—3 of FIGURE 2;

FIGURE 4 is a view similar to FIGURE 2, showing a first modified construction;

FIGURE 5 is a view similar to FIGURES 2 and 4, showing a second modified construction; and FIGURE 6 is a view similar to FIGURES 2, 4, and 5, showing a third modified construction.

The feed mixer 11 shown in the drawings is generally of conventional construction, except with respect to the generally upright conveyer 13. The mixer 11 comprises support means or a frame 15 upon which is mounted a tank or housing 17 having an upper cylindrical portion 19 and a lower frusto-conical portion 21. Carried by the frame 15 is a supply conveyer 23 for delivering one or more of the ingredients to be mixed into the tank 17 and which, in the disclosed construction, communicates with the tank adjacent the bottom of the frusto-conical portion 21.

Also carried by the frame 15 is a conveyer 25 for discharging mixed feed from the tank. In the disclosed construction, the discharge conveyer 25 is disposed in upwardly inclined relation along the side of the frusto-conical portion and communicates through the frusto-conical portion 21 with the lower part of the tank 17.

The upright conveyer 13 includes an auger 27 which, at its upper and lower ends, is supported by the frame through the tank and through suitable bearing means 29 mounted on the tank. The auger 27 is rotatably driven by suitable means such as the illustrated pulley 31. Carried by the tank 17 and disposed around an upper part of the auger 27 is a sleeve 33 in which the auger rotates. The sleeve 33 is constructed and arranged within the tank 17 to provide one or more lengthwise edges 35 located in proximate relation to the peripheral margin of the auger 27 so as to scrape feed adhering to the peripheral margin of the uager. At its lower end, the sleeve 33 includes an inturned lip 37 (see FIGURE 3) having an aperture 39 closely approximating the diameter of the auger 27. The lip 37 serves to limit the amount of material traveling upwardly into the sleeve 33 by initially acting to scrape the peripheral edge portion of the auger 27 at the bottom of the sleeve 33.

The scraping edges 35 can be provided in various ways and can be either generally rectilinear or curvilinear. In the preferred construction, a pair of generally rectilinear scraping edges 35 are provided by assembly of a pair of members 41 each including a central semi-cylindrical segment or section 43, an outwardly turned flange 45 extending from one lengthwise margin of the segment 43, and an inturned flange 47 extending from the other lengthwise margin of the central segment. The members 41 are joined together by suitable means, as for instance, by welding or by bolts, with the inturned flanges 47 in engagement with the outurned flanges as shown best in FIGURE 2. The edges 35 are provided by the intersection of the outurned flanges 45 with the central segments 43 and are supported by the adjacent margins of the integrally extending central segments 43 and by the adjacent inturned flanges 47.

As shown in FIGURE 2, there is also provided a clearance area 49 between the sleeve and the auger, which area progressively increases from one scraping edge 35 to the other in the direction of auger rotation. This area 49 permits downward spilling of the material scraped by the edges 35 and provides increasing clearance to accommodate progressively increased conglomeration during auger travel to the next scraping edge where such conglomerations are broken. The inturned lip 37 closes the bottom of the sleeve 33 in the area 49, terminating adjacent to the peripheral margin of the auger 27.

In the embodiment shown in FIGURE 4, the sleeve 133 has been modified by the use of a pair of members 141 each including inturned flanges 147 along both lengthwise margins of the central semi-cylindrical segment 143. Diametrically opposed scraping edges 135 are provided by the free edges of the flanges 147 of the members 141. As in the preferred embodiment, clearance areas 149 are provided forwardly of the edges 135, and an inturned lip 137 having an aperture approximating the diameter of the auger 127 is provided.

In the embodiment shown in FIGURE 5, a single scraping edge 235 is provided at the junction at an outturned flange 247 extending integrally from a generally semi-cylindrical segment 243 of a member 241. The sleeve 233 is completed by a second member 241a having an inturned flange 247 engaged with the outer side surface of the out-turned flange 245. The member 241a also includes a semi-cylindrical segment 243a which is of somewhat larger diameter than the segment 243 and which overlaps the flange-free margin of the section 243. The construction therefor also includes a clearance area 249 which progressively increases in the direction of auger rotation to a maximum value adjacent the scraping edge 235. As in the other embodiments, a lip 237 is provided at the bottom of the sleeve 233. If desired, the sleeve 233 could be fabricated from a single cylindrical member having in-turned and out-turned flanges at its lengthwise edges.

The construction of the sleeve 333 shown in FIGURE 6 is similar to the construction of the sleeve 233 shown in FIGURE 5 except that the in-turned flange 347 engages the opposite face of the out-turned flange 345 and extends inwardly slightly beyond the corner between the out-turned flange 345 and the central segment 343, thereby providing a single scraping edge 335. The sleeve 333 also incorporates a clearance area 349 similar to the clearance area 249 as well as an auxiliary clearance area 351 which extends from the scraping edge 335 and progressively decreases in area in the direction of auger rotation. Thus, in the embodiment shown in FIGURE 6, clearance is provided on both sides of the scraping edge 335. As in the other embodiments, the sleeve 333 is provided with a lip 337 having a bore with a diameter approximating that of the auger 327.

Various of the features of the invention are set forth in the following claims.

What is claimed is:

1. A screw conveyer comprising an elongated tubular sleeve including a lengthwise edge projecting inwardly thereof, an auger, and means connected with said sleeve and located exteriorly of the ends of said sleeve for rotatably mounting said auger lengthwise within said sleeve for travel of the peripheral margin of said auger in close proximity to said edge.

2. A screw conveyer comprising an arcuate tubular sleeve including a lengthwise edge projecting inwardly thereof, said edge extending substantially continuously throughout the length of said sleeve, an auger, and means connected with said sleeve and located exteriorly of the ends of said sleeve for rotatably mounting said auger lengthwise within said sleeve for travel of the peripheral margin of said auger in close proximity to said edge.

3. A screw conveyer comprising an elongated tubular sleeve including a pair of members each including a segment with a curved transverse cross section, an outwardly turned flange extending integrally from one of the lengthwise margins of one of said segments, means joining said members together with the intersection of said outwardly turned flange and the integrally connected one of said segments providing an edge projecting inwardly of said sleeve and extending lengthwise thereof, an auger, and means connected with said sleeve for rotatably mounting said auger lengthwise within said sleeve for travel of the peripheral margin of said auger in close proximity to said edge.

4. A screw conveyer comprising an elongated tubular sleeve including a pair of members each including a generally semi-circular segment, an inturned flange extending from one of the lengthwise margins of said segment, and an outwardly turned flange extending from the other of the lengthwise margins of said segment, and means joining said members together with said inturned flanges in engagement with said outwardly turned flanges, whereby two diametrically opposed lengthwise edges are provided on the inner surface of said sleeve, an auger, and means connected with said sleeve for rotatably mounting said auger lengthwise within said sleeve for travel of the peripheral margin of said auger in close proximity to said edges.

5. A screw conveyer in accordance with claim 4 wherein said auger extends beyond one end of said sleeve, and said sleeve includes, at said one end, an inturned lip having means defining a circular aperture closely approximating the peripheral diameter of said auger.

6. A screw conveyer comprising an elongated sleeve including a pair of members each including a segment having a curved transverse cross section, an inturned flange extending along one of the lengthwise margins of one of said cylindrical segments, and means joining said members together with the free lengthwise edge of said flange projecting inwardly of said sleeve lengthwise thereof, an auger, and means connected to said sleeve for rotatably mounting said auger lengthwise within said sleeve for travel of the peripheral margin of said auger in close proximity to said edge.

7. A screw conveyer comprising an elongated sleeve including a pair of members each including a semi-cylindrical segment and an inturned flange extending along each of the lengthwise margins of said semi-cylindrical segments, and means joining said members together with said flanges in engagement with each other whereby there is defined two diametrically opposed, lengthwise edges projecting inwardly of said sleeve, an auger, and means connected to said sleeve for rotatably mounting said auger lengthwise within said sleeve for travel of the peripheral margin of said auger in close proximity to said edges.

8. A feed mixer including support means, a mixing tank on said support means having a frusto-conical lower portion, a supply conveyer on said support means communicating with said tank adjacent the bottom of said lower tank portion, a discharge conveyer on said support means and extending parallel to a part of the lower tank portion and communicating with the tank through said lower tank portion, a vertical conveyer extending upright in said tank from adjacent the bottom of said lower tank portion, said conveyer including an upright, elongated tubular sleeve, said sleeve including a lengthwise edge projecting inwardly thereof, an auger, and means on said support means rotatably mounting said auger lengthwise within said sleeve for travel of the peripheral margin of said auger in close proximity to said edge.

9. A feed mixer including support means, a mixing tank on said support means having a frusto-conical lower portion, a supply conveyor on said support means communicating with said tank adjacent the bottom of said lower tank portion, a discharge conveyor on said support means and extending parallel to a part of the lower tank portion and communicating with the tank through said lower tank portion, a vertical conveyer extending upright in said tank from adjacent the bottom of said lower tank portion, said conveyer including an elongated tubular sleeve, said sleeve including a pair of members each including a generally semi-cylindrical segment, an inturned flange extending from one of the lengthwise margins of said segment, and an outwardly turned flange extending from the other of the lengthwise margins of said segment, and means joining said members together with said inturned flanges in engagement with said outwardly turned flanges, whereby two diametrically opposed lengthwise edges are provided on the inner surface of said sleeve, an auger, and means on said support means rotatably mounting said auger lengthwise within said sleeve for travel of the peripheral margin of said auger in close proximity to said edges.

10. A feed mixer in accordance with claim 9 wherein said auger extends beyond the lower end of said sleeve, and said sleeve includes, at said lower end, an inturned lip having means defining a circular aperture closely approximating the peripheral diameter of said auger.

11. A screw conveyer comprising an elongated tubular sleeve including a lengthwise edge projecting inwardly thereof and, at one end, an inturned lip having means defining a circular aperture, an auger, said auger extending beyond said one end of said sleeve and having a peripheral diameter approximating that of said circular aperture, and means connected with said sleeve for rotatably mounting said auger lengthwise within said sleeve for travel of the peripheral margin of said auger in close proximity to said edge.

12. A screw conveyer comprising an elongated tubular sleeve, said sleeve including a member having a segment with an arcuate cross section and an integrally extending outwardly turned flange, said segment and said flange intersecting along an edge extending lengthwise and projecting inwardly of said sleeve, an auger, and means connected with said sleeve for rotatably mounting said auger lengthwise within said sleeve for travel of the peripheral margin of said auger in close proximity to said edge.

13. A screw conveyor comprising an elongated tubular sleeve, said sleeve including a segment with an arcuate cross section and an inturned flange extending integrally from a lengthwise margin of said segment and having a lengthwise edge, an auger, and means connected with said sleeve for rotatably mounting said auger lengthwise within said sleeve for travel of the peripheral margin of said auger in close proximity to said edge.

14. A feed mixer including support means, a mixing tank on said support means having a frusto-conical lower portion, a supply conveyer on said support means communicating with said tank adjacent the bottom of said lower tank portion, a discharge conveyer on said support means and extending parallel to a part of the lower tank portion and communicating with the tank through said lower tank portion, a vertical conveyer extending upright in said tank from adjacent the bottom of said lower tank portion, said conveyer including an upright, elongated tubular sleeve on said support means, said sleeve including a lengthwise edge projecting inwardly thereof, and, at the lower end thereof, an inturned lip having means defining a circular aperture, an auger extending below the lower end of said sleeve and having a peripheral diameter closely approximating that of said circular aperture, and means on said support means rotatably mounting said auger lengthwise within said sleeve for travel of the peripheral margin of said auger in close proximity of said edge.

15. The combination of support means, a mixing tank mounted on said support means and having a frusto-conical lower portion, a vertical conveyer extending upright in said tank from adjacent the bottom of said lower tank portion, said conveyer including an upright, elongated tubular sleeve, said sleeve including a lengthwise edge projecting inwardly thereof, an auger, and means on said tank rotatably mounting said auger lengthwise within said sleeve for travel of the peripheral margin of said auger in close proximity to said edge.

References Cited by the Examiner
UNITED STATES PATENTS

| | | | |
|---|---|---|---|
| 2,770,837 | 11/56 | Reifenhauser | 259—97 |
| 2,896,923 | 7/59 | Luscombe | 259—8 |
| 2,939,770 | 6/60 | Schwartzkopff | 259—8 |

CHARLES A. WILLMUTH, *Primary Examiner.*